(12) United States Patent
Oya

(10) Patent No.: US 11,380,913 B2
(45) Date of Patent: Jul. 5, 2022

(54) FUEL CELL SYSTEM, METHOD OF CONTROLLING FUEL CELL SYSTEM, AND FUEL CELL SYSTEM-MOUNTED VEHICLE

(71) Applicant: TOYOTA JIDOSHA KABUSHIKI KAISHA, Toyota (JP)

(72) Inventor: Ryosuke Oya, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/109,674

(22) Filed: Dec. 2, 2020

(65) Prior Publication Data
US 2021/0091391 A1 Mar. 25, 2021

Related U.S. Application Data

(62) Division of application No. 15/909,752, filed on Mar. 1, 2018, now Pat. No. 10,886,544.

(30) Foreign Application Priority Data

Mar. 31, 2017 (JP) ................................ 2017-069608

(51) Int. Cl.
*H01M 8/04044* (2016.01)
*H01M 8/04225* (2016.01)
*H01M 8/04537* (2016.01)
*H01M 8/1018* (2016.01)
(Continued)

(52) U.S. Cl.
CPC ... *H01M 8/04044* (2013.01); *H01M 8/04225* (2016.02); *H01M 8/04656* (2013.01); *H01M 8/04953* (2016.02); *H01M 8/1018* (2013.01); *H01M 8/22* (2013.01); *H01M 2250/20* (2013.01); *Y02E 60/50* (2013.01); *Y02T 10/70* (2013.01); *Y02T 90/40* (2013.01)

(58) Field of Classification Search
CPC ............................ H01M 8/04; H01M 8/04044
See application file for complete search history.

(56) References Cited

U.S. PATENT DOCUMENTS

| | | | |
|---|---|---|---|
| 6,709,779 | B2 | 3/2004 | Uozumi |
| 2009/0226769 | A1 | 9/2009 | Ota |
| 2010/0167151 | A1 | 7/2010 | Nagasawa |

FOREIGN PATENT DOCUMENTS

| | | |
|---|---|---|
| JP | 2005-228697 | 8/2005 |
| JP | 2005-317276 | 11/2005 |

OTHER PUBLICATIONS

U.S. Appl. No. 15/909,752, filed Mar. 1, 2018.
(Continued)

*Primary Examiner* — James Lee
(74) *Attorney, Agent, or Firm* — Finnegan, Henderson, Farabow, Garrett & Dunner, LLP

(57) ABSTRACT

A fuel cell system FCS includes a fuel cell 10, a high voltage circuit 21 for driving an electromotor 42, and a relay 41 for electrically connecting or blocking the fuel cell 10 to or from the high voltage circuit 21. A control unit 50 obtains insulation decrease information in accordance with a request for starting the fuel cell, and performs, when a specified insulation decrease occurred region is not a fuel cell region SE1 including the fuel cell and the cooling circuit, conductivity reduction process on cooling liquid using a conductivity reduction unit 113 before having a relay 41 connect, and has the relay 41 connect after completing the conductivity reduction process.

10 Claims, 7 Drawing Sheets

(51) Int. Cl.
*H01M 8/22* (2006.01)
*H01M 8/04858* (2016.01)

(56) References Cited

OTHER PUBLICATIONS

Office Action issued in U.S. Appl. No. 15/909,752 dated May 8, 2020.
Notice of Allowance issued in U.S. Appl. No. 15/909,752 dated Oct. 28, 2020.

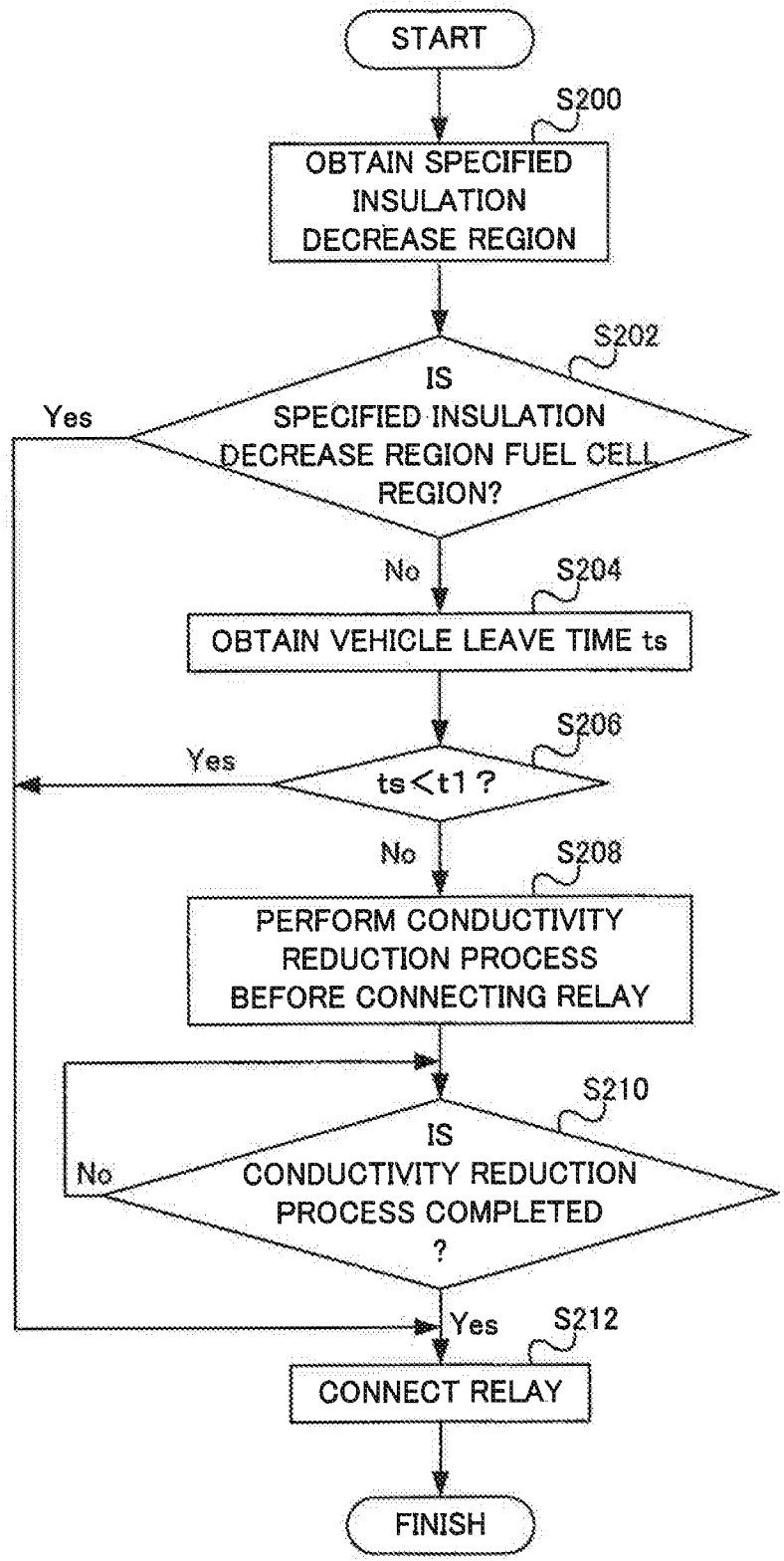

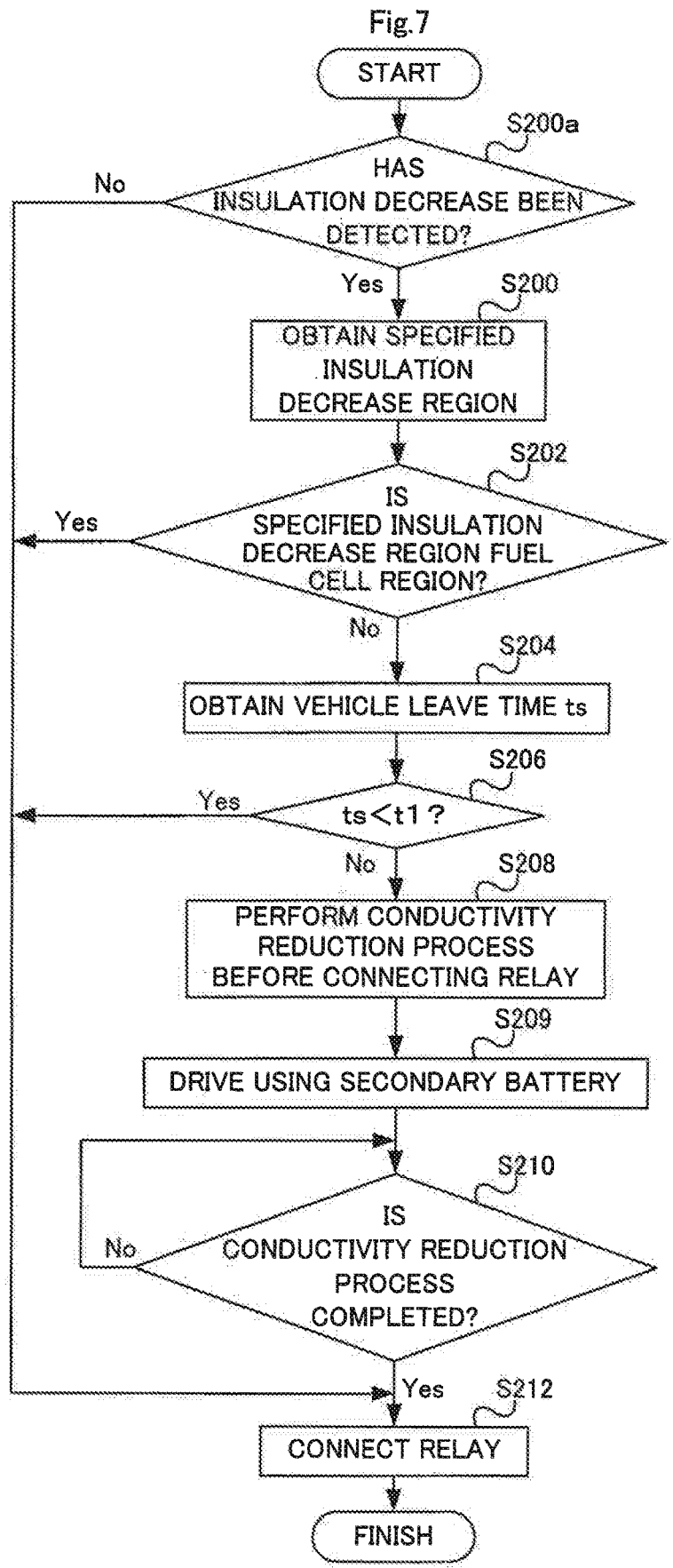

FUEL CELL SYSTEM, METHOD OF CONTROLLING FUEL CELL SYSTEM, AND FUEL CELL SYSTEM-MOUNTED VEHICLE

CROSS-REFERENCE TO RELATED APPLICATIONS

This application is a divisional of U.S. application Ser. No. 15/909,752, filed Mar. 1, 2018, which claims priority to Japanese Patent Application No. 2017-69608, filed Mar. 31, 2017, the disclosures of each of which are incorporated by reference herein in their entirety.

TECHNICAL FIELD

The present disclosure relates to a fuel cell system, a method of controlling a fuel cell system, and a fuel cell system-mounted vehicle.

BACKGROUND ART

In a fuel cell system, a high voltage electrical system including a fuel cell and a high voltage circuit driving an electromotor is isolated from surrounding components in contact with the fuel cell system or a supporting body supporting the high voltage electrical system. A cooling circuit cooling the fuel cell is not a current circuit, and thus the insulation thereof from the supporting body is not considered generally. Therefore, the increase of conductivity of cooling liquid may decrease insulation of the fuel cell system through the cooling circuit. For example, it is known that when the fuel cell system is stopped, metal ion is eluted into cooling liquid from metal parts forming a cooling circuit cooling a fuel cell, and the metal ion increases conductivity of the cooling liquid. In view of such a problem, a technology of removing metal ion in cooling liquid during operation of a fuel cell and reducing conductivity of the cooling liquid is proposed.

However, in the conventional technology, the process for reducing conductivity of cooling liquid is performed after the fuel cell is started without considering insulation decrease through paths other than a cooling circuit, e.g., insulation decrease through a high voltage circuit. When the insulation decrease is occurred on a path other than a cooling circuit, a current path electrically connecting the cooling circuit and the high voltage circuit in the outside of the fuel cell system may be formed. Thus, when the fuel cell is started, a high voltage may be applied on the outer current path.

SUMMARY

Therefore, it is desired to start, in a fuel cell system, a fuel cell without forming a high voltage path connecting a cooling circuit and a high voltage circuit in the outside of the fuel cell system.

Solution to Problem

The present disclosure is made to solve the above-described problems, and may be achieved by the following aspects.

The first aspect provides a fuel cell system. A fuel cell system according to the first aspect includes a fuel cell, a high voltage circuit configured to drive an electromotor, a relay disposed between the fuel cell and the high voltage circuit, the relay configured to electrically connect or block the fuel cell to or from the high voltage circuit, a cooling circuit provided with the fuel cell, the cooling circuit including cooling liquid to cool the fuel cell, a conductivity reduction unit disposed on the cooling circuit, the conductivity reduction unit configured to reduce conductivity of the cooling circuit, a storage unit that stores insulation decrease information specifying an insulation decrease occurred region in the fuel cell system, and a control unit that obtains the insulation decrease information upon receipt of a request for starting the fuel cell, and perform, when the specified insulation decrease occurred region is not a fuel cell region including the fuel cell and the cooling circuit, conductivity reduction process on the cooling liquid using the conductivity reduction unit before having the relay connect, and has the relay connect after completing the conductivity reduction process.

In the fuel cell system according to the first aspect, when the specified insulation decrease occurred region is not a fuel cell region including the fuel cell and the cooling circuit, the control unit performs conductivity reduction process on the cooling liquid using the conductivity reduction unit before having the relay connect, and has the relay connect after completing the conductivity reduction process. Therefore, it is possible to start the fuel cell without forming a high voltage path connecting the cooling circuit and the high voltage circuit in the outside of the fuel cell system.

In the fuel cell system according to the first aspect, the control unit may have the relay connect without performing the conductivity reduction process when the specified insulation decrease occurred region is not the fuel cell region and a stop period of the fuel cell system is shorter than a predetermined period, or may perform the conductivity reduction process and has the relay connect after completing the conductivity reduction process when the specified insulation decrease occurred region is not the fuel cell region and the stop period of the fuel cell system is equal to or longer than the predetermined period. In such a case, even when the specified insulation decrease occurred region is not a fuel cell region, whether the conductivity reduction process is performed is determined considering conductivity of cooling liquid. Thus, it is possible to achieve both the quick start of the fuel cell and the prevention of formation of the high voltage path in the outside of the fuel cell system.

In the fuel cell system according to the first aspect, the control unit may have the relay connect without performing the conductivity reduction process when the specified insulation decrease occurred region is the fuel cell region. In such a case, it is possible to quickly start the fuel cell without forming the high voltage path in the outside of the fuel cell system.

The fuel cell system according to the first aspect further includes a secondary battery connected to the high voltage circuit, in which the control unit may drive, when the conductivity reduction process is performed, the electromotor using the secondary battery before completing the conductivity reduction process, and have the relay connect after completing the conductivity reduction process to drive the electromotor using the fuel cell. In such a case, it is possible to drive the electromotor even during the conductivity reduction process and prevent formation of the high voltage circuit in the outside of the fuel cell system.

In the fuel cell system according to the first aspect, the cooling circuit includes a cooling liquid pump allowing circulation of the cooling liquid, and the control unit may perform the conductivity reduction process by driving the cooling liquid pump using power of the secondary battery and letting the cooling liquid flow to the conductivity reduction unit. In such a case, it is possible to perform conductivity reduction process of cooling liquid without starting the fuel cell.

In the fuel cell system according to the first aspect, the insulation decrease information further includes information of whether insulation decrease is occurred, and the control unit may perform, when the insulation decrease information indicates occurrence of insulation decrease, the conductivity reduction process in accordance with the insulation decrease occurred region, or has the relay connect without performing the conductivity reduction process when the insulation decrease information does not indicate occurrence of insulation decrease. In such a case, it is possible to perform activation process of the fuel cell system considering whether the insulation decrease is occurred.

The fuel cell system according to the first aspect further includes an insulation detection device that detects insulation decrease in the fuel cell system, in which the control unit may specify whether a detected insulation decrease occurred region is the fuel cell region or a region other than the fuel cell region, generate the insulation decrease information, and store the insulation decrease information in the storage unit. In such a case, it is possible to generate information for starting the fuel cell without forming the high voltage path in the outside of the fuel cell system in the next activation of the fuel cell system.

In the fuel cell system according to the first aspect, the control unit may specify the insulation decrease occurred region, generate the insulation decrease information, and store the insulation decrease information in the storage unit when the fuel cell system is stopped. In such a case, it is possible to generate information for starting the fuel cell without forming the high voltage path in the outside of the fuel cell system in the next activation of the fuel cell system.

The second aspect provides a vehicle. A vehicle according to the second aspect includes the fuel cell system according to the first aspect, in which the high voltage circuit, the fuel cell, and the cooling circuit are supported by the vehicle, and the insulation decrease is insulation decrease between a vehicle body of the vehicle and the fuel cell system. In the vehicle according to the second aspect, it is possible to start the fuel cell without forming the high voltage path connecting the cooling circuit and the high voltage circuit in the vehicle body of the vehicle.

The third aspect provides a method of controlling a fuel cell system with a fuel cell. A method of controlling a fuel cell system with a fuel cell according to the third aspect includes receiving a request for starting the fuel cell, obtaining insulation decrease information specifying an insulation decrease occurred region in the fuel cell system, and performing, when the specified insulation decrease occurred region is not a fuel cell region including the fuel cell and a cooling circuit with cooling liquid circulating therein, conductivity reduction process on the cooling liquid before having a relay connect, which is arranged between a high voltage circuit for driving an electromotor and the fuel cell, and performing start process including having connection of the relay connect after completing the conductivity reduction process.

In the method of controlling a fuel cell system according to the third aspect, it is possible to obtain the same action effects as the fuel cell system according to the first aspect. Moreover, the method of controlling a fuel cell system according to the third embodiment may be achieved by various aspects similarly to the fuel cell system according to the first aspect. Furthermore, the method of controlling a fuel cell system according to the third aspect may be also achieved as a computer program or a recording medium readable by a computer storing the computer program.

BRIEF DESCRIPTION OF DRAWINGS

FIG. 6 is a flowchart illustrating a process routine of system activation process performed in activation of the fuel cell system according to a second embodiment.

FIG. 7 is a flowchart illustrating a process routine of system activation process performed in activation of the fuel cell system according to a third embodiment.

DESCRIPTION OF EMBODIMENTS

The following will describe a fuel cell system, a method of controlling a fuel cell system, and a fuel cell system-mounted vehicle according to the present disclosure.

First Embodiment

Figure 1:
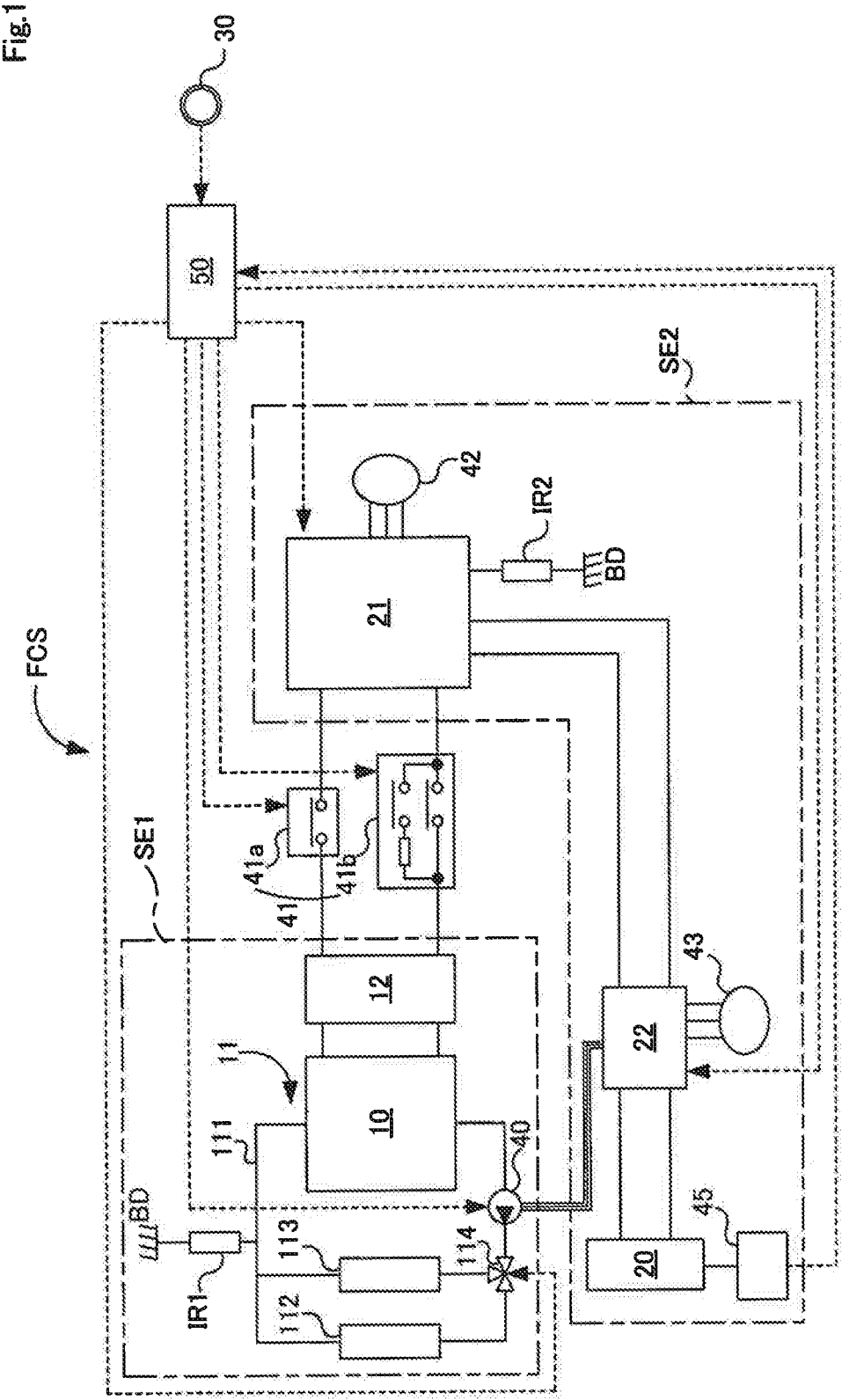
FIG. 1 is an explanatory diagram illustrating a schematic configuration of a fuel cell system applicable to each embodiment in common.
Figure 2:
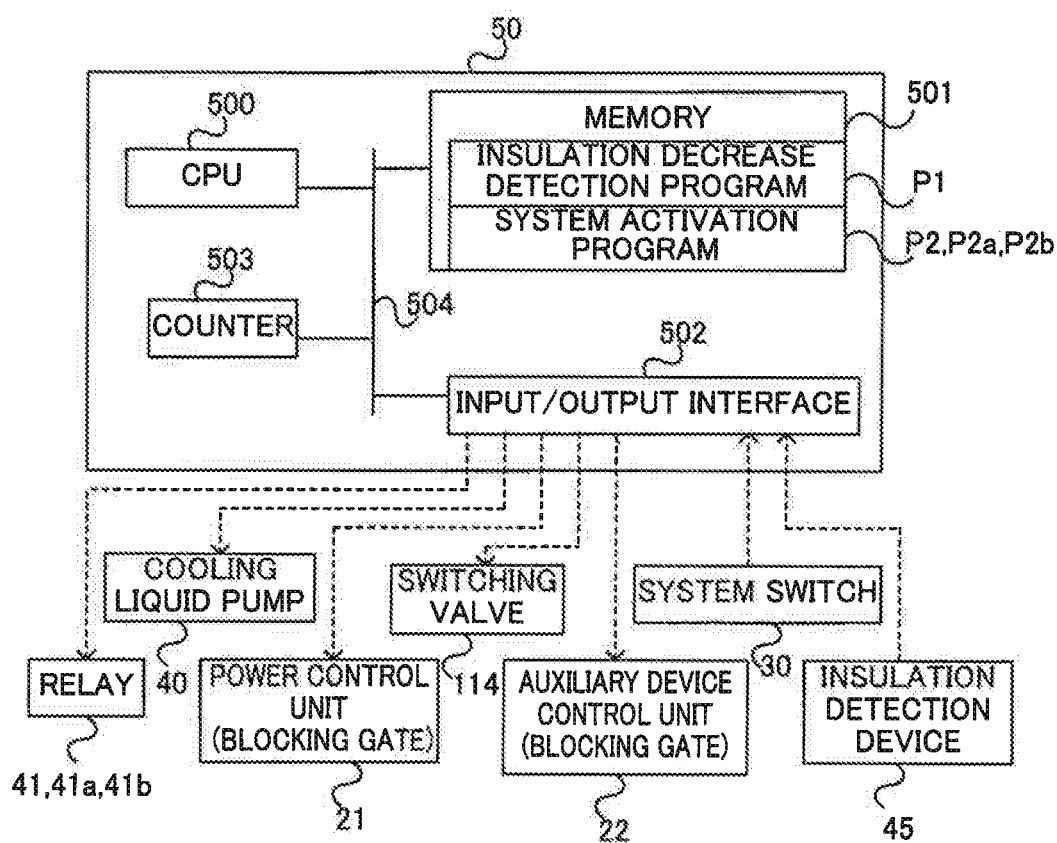
FIG. 2 is a block diagram illustrating a control unit applicable to each embodiment in common.

FIG. 1 is an explanatory diagram illustrating a schematic configuration of a fuel cell system applicable to each embodiment in common. FIG. 2 is a block diagram illustrating a control unit applicable to each embodiment in common.

A fuel cell system FCS according to the first embodiment includes a fuel cell 10, a high voltage device for fuel cell 12, a secondary battery 20, a power control unit 21, an auxiliary device control unit 22, a system switch 30, a driving motor 42, a high voltage auxiliary device 43, and a control unit 50. The fuel cell system FCS includes a fuel cell region SE1 including the fuel cell 10 and the high voltage device for fuel cell 12, and a fuel cell outside region SE2 including the secondary battery 20, the power control unit 21, the auxiliary device control unit 22, the driving motor 42, and the high voltage auxiliary device 43. The fuel cell region SE1 and the fuel cell outside region SE2 are electrically connected to each other through a relay 41. The power control unit 21 and the auxiliary device control unit 22 are high voltage circuits, and at least the power control unit 21 may be provided. The following will describe an example in which the fuel cell system FCS is mounted on a vehicle.

The fuel cell system FCS is insulated from a vehicle body BD when mounted on a vehicle. Therefore, it is regarded that insulation resistance IR1 is arranged virtually between the fuel cell system FCS and the vehicle body BD. Moreover, the high voltage circuit forming the fuel cell system FCS, e.g., the power control unit 21 and the auxiliary device control unit 22 are also insulated from the vehicle body BD, or insulated from a low voltage circuit configuring the conventional electrical circuit. Therefore, it is regarded that insulation resistance IR2 is arranged virtually between the high voltage circuit and the vehicle body BD and the low voltage circuit configuring the conventional electrical circuit. Note that it is also possible to regard that the fuel cell system FCS is grounded to the vehicle body BD. In the following, a region to be insulated from the high voltage circuit is collectively referred to as the vehicle body BD.

The fuel cell 10 is a solid polymer type fuel cell capable of generating power by electrochemical reaction between air as oxidization gas and hydrogen as fuel gas, for example. In the specification, oxidization gas and fuel gas are collectively referred to as reaction gas. The fuel cell 10 includes a cooling circuit 11 for cooling the fuel cell 10.

The cooling circuit 11 includes a cooling pipe 111, a heat exchanger 112, an ion exchanger 113, a switching valve 114, and a cooling liquid pump 40. The ion exchanger 113 is a conductivity reduction unit including therein ion exchange resin functioning as an ion removal filter, and removes conductivity ion in passing cooling liquid to reduce conductivity of the cooling liquid.

The cooling liquid pump 40 is a pump controlled by the control unit 50 to allow circulation of cooling liquid in the cooling pipe 111, and is included in the high voltage auxiliary device. The cooling liquid pump 40 feeds cooling liquid from which heat has been removed by the fuel cell 10 to the heat exchanger 112, that is, a radiator, or to the ion exchanger 113, and introduces the cooling liquid cooled by the heat exchanger 112 or the cooling liquid subjected to conductive ion removing process by the ion exchanger 113 again to the fuel cell 10. The switching valve 114 is a three-way valve controlled by the control unit 50 to switch a feeding destination of cooling liquid between the heat exchanger 112 and the ion exchanger 113. The switching valve 114 switches a feeding destination of cooling liquid to the ion exchanger 113 when conductivity reduction process of cooling liquid is performed, while it switches a feeding destination of cooling liquid to the heat exchanger 112 when conductivity reduction process is not performed, that is, in normal operation.

The cooling circuit 11 is fixed to the vehicle body BD by conductive fastening tools such as metal bolts, nuts, for example, through a mounting frame. As cooling liquid, generally pure water or cooling liquid with low conductivity is used, and the cooling circuit 11 is substantially insulated electrically from the vehicle body BD. That is, insulation resistance IR1 exists between the cooling circuit 11 and the vehicle body BD. However, it is known that when the vehicle is parked and the fuel cell system FCS system is stopped, metal ion is eluted into the cooling liquid from the cooling pipe 111 and the heat exchanger 112 generally formed of metal materials, the metal ion increases the conductivity of the cooling liquid. The increase of the conductivity of cooling liquid decreases insulation between the cooling circuit 11 and the vehicle body BD, that is, insulation resistance IR1. Then, there is performed, if necessary, conductivity reduction process of cooling liquid using the ion exchanger 113.

The high voltage device for fuel cell 12 is a high voltage circuit for increasing an output voltage of the fuel cell 10 to a given voltage required to drive the driving motor 42, and includes therein a step-up converter. DC power boosted by the high voltage device for fuel cell 12 is supplied to the power control unit 21, converted into AC power, and supplied to the driving motor 42.

The relay 41 is a relay controlled by the control unit 50 to mechanically block the fuel cell 10 from other electrical circuits of the fuel cell system FCS, and includes therein a first relay 41a and a second relay 41b. When the relay 41 is connected, it is possible to drive the driving motor 42 using power generated by the fuel cell 10. To be more specific, the first relay 41a and the second relay 41b are able to switch, by control signals from the control unit 50, their positions to off-positions for performing electrical blocking or on-positions for performing electrical communication. When the relay 41 is turned on, the first relay 41a is turned on first and then the second relay 41b is turned on. The second relay 41b is provided with a precharge resistance for preventing and reducing a rush current when the relay is turned on.

The secondary battery 20 is connected to the power control unit 21 through the auxiliary device control unit 22. The secondary battery 20 is connected to an insulation detection device 45. As the secondary battery 20, a lithium ion battery, a nickel hydrogen battery, or a capacitor may be used, for example.

The power control unit 21 is a control unit for mainly controlling the operation of the driving motor 42 that is a three-phase AC motor, and allows power operation or regenerative operation of the driving motor 42. The power control unit 21 includes, for example, a control unit, an inverter for motor and a step-up/step-down converter for secondary battery that are controlled by the control unit, and a blocking gate for mechanically blocking electrical connection with the driving motor 42. The power control unit 21 increases an output voltage of the secondary battery 20 to a driving voltage of the driving motor 42. The power control unit 21 converts, in power operation, DC power from the fuel cell 10 boosted by the high voltage device for fuel cell 12 or DC power from the secondary battery 20 boosted by the step-up/step-down converter into AC power, and supplies it to the driving motor 42. The power control unit 21 converts, in regenerative operation, AC power output from the driving motor 42 by the step-up/step-down converter into DC power, reduces a voltage, and supplies it to the secondary battery 20. The AC power in regenerative operation may be used to drive the high voltage auxiliary device 43 that is an auxiliary device of the fuel cell 10.

The auxiliary device control unit 22 receives power supply from the fuel cell 10 through the high voltage device for fuel cell 12 or power supply from the secondary battery 20. The auxiliary device control unit 22 is provided with an inverter. The inverter converts DC power supplied from the fuel cell 10 or the secondary battery 20 into AC power to control an AC motor driving the high voltage auxiliary device 43. The auxiliary device control unit 22 further includes a blocking gate for mechanically blocking electrical connection with the high voltage auxiliary device 43. Although in FIG. 1, the cooling liquid pump 40 and the high voltage auxiliary device 43 are connected to one auxiliary device control unit 22 to simplify the illustration and explanation, the auxiliary device control unit 22 is arranged for each high voltage auxiliary device 43.

The driving motor 42 is a three-phase AC motor for driving a vehicle, and the output thereof is controlled by the power control unit 21 having received, from the control unit 50, control signals in accordance with a request from a driver input through an input unit such as an acceleration pedal. Other AC motors or DC motors may be used as the driving motor 42.

The high voltage auxiliary device 43 is an auxiliary device driven by a motor operating at a high voltage generally equal to or higher than 100V, and includes, for example, an air compressor feeding air to the fuel cell 10, and a hydrogen pump for allowing circulation of hydrogen gas in an anode gas supply system. Note that the cooling liquid pump 40 for circulation of cooling liquid in the cooling circuit 11 is also included in the high voltage auxiliary device. Meanwhile, a low voltage auxiliary device generally indicates an auxiliary device driven at a low voltage of 12 to 48V.

The insulation detection device 45 is a device for detecting insulation resistance in the fuel cell system FCS. To be specific, the insulation detection device 45 detects reduction of the above-described insulation resistance IR1, IR2. For example, the insulation detection device 45 applies an AC voltage with a predetermined frequency on a high voltage electrical system of the fuel cell system FCS, generates a voltage value reducing in accordance with insulation decrease of the high voltage electrical system, and outputs it to the control unit 50 as detection signals. Note that the high voltage electrical system indicates an electrical system to which high voltage power is supplied in the fuel cell system FCS that is defined by the fuel cell region SE1 and the fuel cell outside region SE2.

The system switch 30 is a switch for activating or stopping the fuel cell system FCS, and corresponds to an ignition switch in an internal combustion engine vehicle. Note that the input by the system switch 30 may include accessory positions allowing operation of electric components such as an air conditioner, a navigation device, and an audio device, and on-positions allowing driving of the vehicle by the driving motor 42. The positions may be switched to on-positions in operation of the system switch 30 with stepping of a brake pedal, or to on-positions when the system switch 30 is held down, for example.

The following will describe the control unit 50. The control unit 50 includes a central processing unit (CPU) 500, a memory 501, an input/output interface 502, a counter 503, and an inner bus 504. The control unit 50 is operated by power supply from a low voltage secondary battery (not illustrated). The CPU 500, the memory 501, the input/output interface 502, and the counter 503 are connected through the inner bus 504 so as to be able to communicate bidirectionally. The memory 501 includes a memory as a storage unit storing an insulation decrease detection program P1 for detecting insulation decrease of the fuel cell system FCS, a system activation program P2, P2a, P2b executed in activation of the fuel cell system FCS in a non-volatile manner and read-only manner, e.g., a ROM, and a memory allowing reading and writing by the CPU 500, e.g., a RAM. The memory 501 further includes insulation decrease information specifying an insulation decrease occurred region that is stored when the insulation decrease in the fuel cell system FCS is detected by execution of the insulation decrease detection program P1. Note that the insulation decrease information may contain information of not only an insulation decrease occurred region but also whether the insulation decrease is detected.

The CPU 500 loads the insulation decrease detection program P1 stored in the memory 501 into a memory allowing reading and writing and executes it to function as an insulation decrease detection unit. In addition, the CPU 500 executes the system activation program P2 to function as a system activation unit. In the first embodiment, the memory 501 only needs to store at least the system activation program P2, and may arbitrarily store other programs. Moreover, the CPU 500 may be a multi-sled type CPU singly capable of process a plurality of execution orders, or a plurality of CPUs dedicated to execute each of the programs P1 and P2. When the CPU 500 is achieved by a plurality of CPUs, each CPU and a memory storing programs form an individual control unit, and cooperative process is performed by mutual communication between the control units.

The system switch 30 and the insulation detection device 45 are connected to the input/output interface 502 through detection signal lines. The auxiliary device control unit 21 and the auxiliary device control unit 22 including the blocking gate, the cooling liquid pump 40, and the switching valve 114 are connected to the input/putout interface 502 through control signal lines.

The counter 503 may be an oscillation circuit transmitting clock signals with given time intervals or a circuit counting a given number of clock signals and outputting detection signals. In the former case, the CPU 500 counts the number of clock signals. In the latter case, the CPU 500 obtains information indicating the elapse of a given period by input of detection signals from the counter 503.

Figure 3:
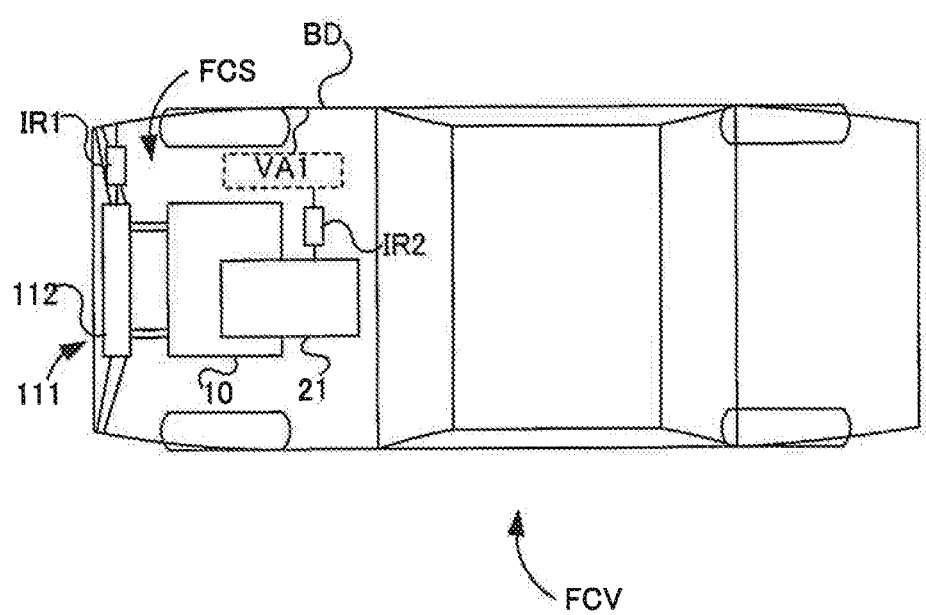
FIG. 3 is an explanatory diagram for explaining an insulation decrease occurred region in a fuel cell system according to a first embodiment.
Figure 4:
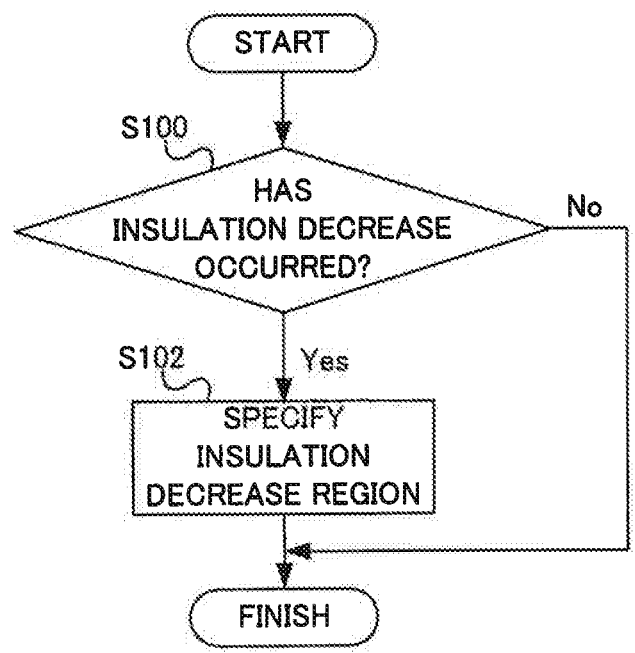
FIG. 4 is a flowchart illustrating a process routine of insulation decrease detection process performed in the fuel cell system according to the first embodiment.

The following will describe insulation decrease detection process performed by the fuel cell system FCS according to the first embodiment. FIG. 3 is an explanatory diagram for explaining an insulation decrease occurred region in the fuel cell system according to the first embodiment. FIG. 4 is a flowchart illustrating a process routine of insulation decrease detection process performed in the fuel cell system according to the first embodiment.

In a fuel cell vehicle FCV with the fuel cell system FCS mounted, the fuel cell system FCS is generally insulated from the vehicle body BD and a low voltage circuit VA1. To be more specific, the cooling circuit 11 of the fuel cell 10 includes the metal heat exchanger 112 and piping, and the heat exchanger 112 is fixed to the vehicle body BD through a metal frame. Cooling liquid with low conductivity flows in the cooling pipe 111, and the insulation resistance IR1 exists between the cooling circuit 11 and the vehicle body BD as long as the conductivity of cooling liquid is kept low. Meanwhile, when metal ion is eluted in cooling liquid, the conductivity of the cooling liquid increases, which reduces the insulation resistance IR1 between the vehicle body BD and the cooling circuit 11, that is, between the vehicle body BD and the fuel cell 10. Note that the cooling circuit 11 is electrically grounded to the vehicle body BD.

The high voltage circuit, e.g., the power control unit 21 is insulated from the vehicle body BD, and the insulation resistance IR2 exists between the high voltage circuit and the vehicle body BD. The high voltage circuit may be connected to the vehicle body BD through the low voltage circuit VA1. In such a case, the high voltage circuit is insulated from the low voltage circuit VA1, and the insulation resistance IR2 exists between the power control unit 21 and the low voltage circuit VA1. That is, the high voltage circuit is grounded to the vehicle body BD. For example, the decrease of insulation members between the high voltage circuit and the low voltage circuit VA1 may damage a covering of a harness connected to the high voltage circuit and decrease the insulation resistance IR2.

The insulation decrease detection process is achieved by the CPU 500 executing the insulation decrease detection program P1 with given time intervals during operation of the fuel cell system FCS. The CPU 500 determines whether the insulation detection device 45 has detected occurrence of insulation decrease of the fuel cell system FCS (Step S100). As described above, when insulation decrease is not occurred in the fuel cell system FCS, the insulation detection device 45 outputs a high voltage value to the CPU 500 as detection signals. When insulation decrease is occurred in the fuel cell system FCS, the insulation detection device 45 outputs a lower voltage value than a voltage value in the case where no insulation decrease is occurred to the CPU 500 as detection signals. When a high voltage value is input as detection signals, the CPU 500 determines that insulation decrease is not occurred in the fuel cell system FCS (No at Step S100), and finishes the process routine.

When a low voltage value is input as detection signals, the CPU 500 determines that insulation decrease is occurred in the fuel cell system FCS (Yes at Step S100), specifies an insulation decrease occurred region (Step S102), and finishes the process routine. The insulation decrease occurred region is specified by the CPU 500 before the operation of the fuel cell system FCS is stopped when the system switch 30 is turned off.

The CPU 500 sequentially blocks the blocking gates of the power control unit 21 and the auxiliary device control unit 22, and the relay 41. When detection signals output by the insulation detection device 45 indicate a low voltage value after the blocking gate of the auxiliary device control unit 22 is blocked, the CPU 500 determines that insulation decrease is occurred between the auxiliary device control unit 22 or the high voltage auxiliary device 43 and the vehicle body BD. When detection signals output by the insulation detection device 45 still indicate a low voltage value after the blocking gate of the auxiliary device control unit 22 is blocked, the CPU 500 blocks the blocking gate of the power control unit 21. When detection signals output by the insulation detection device 45 indicate a low voltage value, the CPU 500 determines that insulation decrease is occurred between the power control unit 21 or the driving motor 42 and the vehicle body BD. When detection signals output by the insulation detection device 45 still indicate a low voltage value after the blocking gate of the power control unit 21 is blocked, the CPU 500 blocks the relay 41. When detection signals output by the insulation detection device 45 indicate a low voltage value, the CPU 500 determines that insulation decrease is occurred between the fuel cell 10, the cooling circuit 11, or the high voltage device for fuel cell 12 and the vehicle body BD.

The CPU 500 stores information of insulation decrease and information of an insulation decrease region in the memory 501 as insulation decrease information, and finishes the fuel cell system FCS. In the embodiment, the information of an insulation decrease region may be information specifying at least one of the fuel cell region SE1 with the fuel cell 10 and the high voltage device for fuel cell 12, and the fuel cell system outside region SE2 with the secondary battery 20, the power control unit 21, the auxiliary device control unit 22, the driving motor 42, and the high voltage auxiliary device 43.

Figure 5:
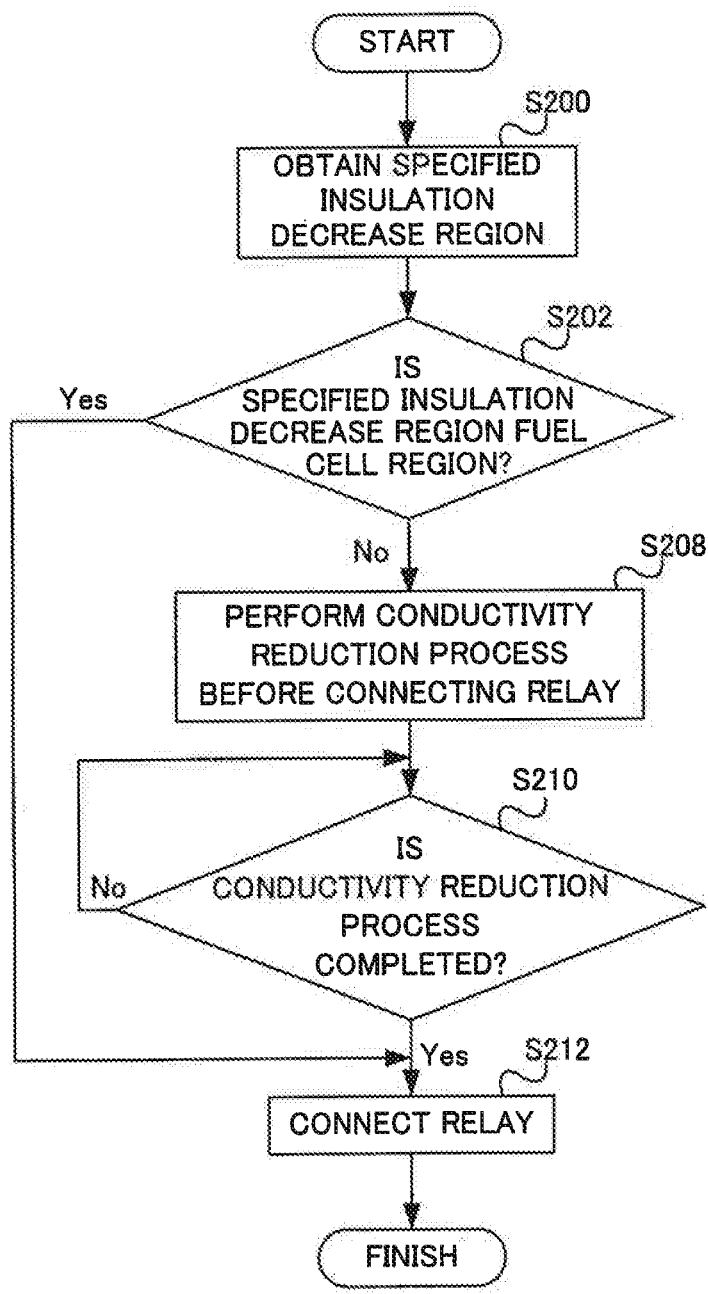
FIG. 5 is a flowchart illustrating a process routine of system activation process performed in activation of the fuel cell system according to the first embodiment.

The insulation decrease information stored in the memory 501 is used in the next activation of the fuel cell system FCS. FIG. 5 is a flowchart illustrating a process routine of system activation process performed in activation of the fuel cell system according to the first embodiment. The system activation process in the first embodiment is achieved by the CPU 500 executing the system activation program P2 in response to on-input of the system switch 30, that is, an activation request, when it is indicated that insulation decrease is detected during the previous operation of the fuel cell system FCS. Note that the relay 41 is in a blocked state, that is, a non-connected state, when the fuel cell system FCS is finished.

The CPU 500 obtains insulation decrease information stored in the memory 501, and obtains a specified insulation decrease region (Step S200). In the first embodiment, the specified insulation decrease region is the fuel cell region SE1 or the fuel cell outside region SE2.

The CPU 500 determines whether the specified insulation decrease region is the fuel cell region SE1 (Step S202). When the specified insulation decrease region is the fuel cell region SE1 (Yes at Step S202), the process moves to Step S212 so that the CPU 500 has the relay 41 connect and finishes the process routine. Therefore, the CPU 500 transmits control signals in accordance with a request output from a driver to the power control unit 21, and drives the driving motor 42 with the fuel cell 10 as a power source to allow the vehicle FCV to travel. When the specified insulation decrease region is the fuel cell region SE1, the insulation decrease part in the fuel cell system FCS is one. In the outside of the fuel cell system FCS, the fuel cell region SE1 and the fuel cell outside region SE2 are not electrically connected through the vehicle body BD, and a current path in the outside of the fuel cell system FCS, that is, an outer current path electrically connecting the fuel cell region SE1 and the fuel cell outside region SE2 is not formed even with the relay 41 connected. Note that the outside of the fuel cell system FCS indicates an outer configuration insulated from the high voltage electrical system of the fuel cell system FCS, e.g., the vehicle body BD and the low voltage circuit. The outer current path is a path electrically connecting the fuel cell region SE1 and the fuel cell outside region SE2, which is formed in the outer configuration of the fuel cell system FCS. Therefore, even when the fuel cell 10 is started, and allowing driving of the driving motor 42 with the fuel cell 10 as a power source, no current leak to the outside of the high voltage electrical system, e.g., the vehicle body BD from the fuel cell 10 is occurred. The start of the fuel cell 10 means the state in which power generation is possible with the fuel cell 10 connected to a load, and includes at least the start of supply of reaction gas to the fuel cell 10. In addition, to solve insulation decrease due to increase of conductivity of cooling liquid, conductivity reduction process is performed during operation of the fuel cell 10 to suppress insulation decrease. In this manner, when the insulation decrease region is the fuel cell region SE1, the relay 41 is connected to connect the fuel cell 10 with the power control unit 21 at timing when the drive of the driving motor 42 is requested without adjusting timing between connection timing of the relay 41 and another process.

When the specified insulation decrease region is not the fuel cell region SE1 (No at Step S202), the CPU 500 performs conductivity reduction process before having the relay 41 connect (Step S208)

In the conductivity reduction process, the CPU 500 transmits control signals to the auxiliary device control unit 22 driving the cooling liquid pump 40, and transmits control signals for switching a feeding destination of cooling liquid to the ion exchanger 113, to the switching valve 114. The cooling liquid pump 40 is driven using power of the secondary battery 20. As a result, metal ion eluted in the cooling liquid is removed by the ion exchanger 113. The CPU 500 retains the cooling liquid path through the ion exchanger 113 until the conductivity reduction process is completed (No at Step S210). Once the conductivity reduction process is completed (Yes at Step S210), the CPU 500 transmits control signals for switching a feeding destination of cooling liquid to the heat exchanger 112, to the switching valve 114. The completion of the conductivity reduction process may be determined by waiting the elapse of conductivity reduction process time predetermined experimentally, e.g., the elapse of several minutes, or may be determined when a conductivity detected by a conductivity detection sensor disposed for the ion exchanger 113 is reduced to a conductivity reference value. The cooling liquid pump 40 is driven using power of the secondary battery 20, and thus it is possible to perform conductivity reduction process of cooling liquid without starting the fuel cell 10. Moreover, the relay 41 is blocked, and thus the fuel cell region SE1 and the fuel cell outside region SE2 are not communicated electrically, which prevents application of power of the secondary battery 20 on the outer current path.

Once the conductivity reduction process is completed, the CPU 500 has the relay 41 connect(Step S212), starts the fuel cell 10 to allow driving of the driving motor 42 using the fuel cell 10, and finishes the process routine. Thereafter, the CPU 500 transmits control signals in accordance with a request output from a driver to the power control unit 21, and drives the driving motor 42 to allow the vehicle FCV to travel.

In the above-described fuel cell system FCS according to the first embodiment, when insulation decrease of the fuel cell system FCS is occurred in the fuel cell outside region SE2, the relay 41 is connected after completion of the conductivity reduction process of cooling liquid. Therefore, even when the insulation between the vehicle body BD and the fuel cell region SE1 is decreased due to increase of conductivity of cooling liquid, and the fuel cell region SE1 and the fuel cell outside region SE2 are connected electrically through the vehicle body BD, the fuel cell region SE1 and the fuel cell outside region SE2 are not electrically connected in the fuel cell system FCS, and there is not formed an outer current path electrically connecting the vehicle body BD, the fuel cell region SE1, and the fuel cell outside region SE2. In this manner, no current leak from the high voltage circuit such as the fuel cell region SE1 and the fuel cell outside region SE2 to the vehicle body BD is occurred.

In the fuel cell system FCS according to the first embodiment, even when insulation decrease is detected when the previous operation of the fuel cell system FCS is finished, conductivity reduction process is not performed if the insulation decrease region is the fuel cell region SE1, which allows quick start of the fuel cell 10 in response to a start request. When the insulation decrease region is the fuel cell region SE1, the fuel cell region SE1 and the fuel cell outside region SE2 are not connected electrically through the vehicle body BD. Therefore, in the fuel cell system FCS according to the first embodiment, start timing of the fuel cell 10 is changed in accordance with a specified insulation decrease region, whereby it is possible to start the fuel cell 10 more quickly and prevent a current leak from the high voltage circuit of the fuel cell system FCS to the outer current path in the outside of the fuel cell system FCS.

Second Embodiment

The fuel cell system according to the second embodiment will be described. FIG. 6 is a flowchart illustrating a process routine of system activation process performed in activation of the fuel cell system according to the second embodiment. The hardware configuration of the fuel cell system according to the second embodiment is the same as that of the fuel cell system FCS according to the first embodiment. Thus, the same symbols as in the first embodiment are given to omit the explanation. Moreover, the system activation program P2a of the second embodiment is different from the system activation program P2a of the first embodiment in the point that when the insulation decrease region is the fuel cell outside region SE2, whether conductivity reduction process is to be performed is determined considering vehicle leave time. Therefore, the same process step as in the activation process in the first embodiment is represented with the same symbol and the explanation thereof is omitted. The different process steps will be described in detail.

The system activation process in the second embodiment is achieved by the CPU 500 performing, when it is indicated that the insulation decrease is detected during the previous operation of the fuel cell system FCS, the system activation program P2a in accordance with an on-input of the system switch 30.

The CPU 500 performs Steps S200 and S202, and when the specified insulation decrease region is the fuel cell region SE1 (Yes at Step S202), the process moves to Step S212 so that the CPU 500 has the relay 41 connect and finishes the process routine. Therefore, the CPU 500 transmits control signals in accordance with a request output from a driver to the power control unit 21, and drives the driving motor 42 with the fuel cell 10 as a power source to allow the vehicle FCV to travel.

When the specified insulation decrease region is not the fuel cell region SE1 (No at Step S202), that is, when the specified insulation decrease region is the fuel cell outside region SE2, the CPU 500 obtains vehicle leave time ts (s) from the counter 503 or the memory 501 (Step S204). The vehicle leave time ts is elapsed time from the stop of the fuel cell system FCS to the turn-on of the system switch 30, and may be referred to as a stop period of the fuel cell system FCS. When the counter 503 counts and retains the elapsed time from the stop of the fuel cell system FCS, the vehicle leave time ts is obtained from the counter 503. When the CPU 500 counts and stores clock signals output from the counter 503 in the memory 501, the vehicle leave time ts is obtained from the memory 501.

The CPU 500 determines whether the obtained vehicle leave time ts is shorter than predetermined reference time t1 (s) (Step S206). When the vehicle leave time ts is shorter than the reference time t1 and the relation ts<t1 is fulfilled (Yes at Step S206), the process moves to Step S212 so that the CPU 500 has the relay 41 connect and starts the fuel cell 10 to allow power generation for power supply to the driving motor 42. The CPU 500 transmits control signals in accordance with a request output from a driver to the power control unit 21, and drives the driving motor 42 with the fuel cell 10 as a power source to allow the vehicle FCV to travel. The reference time t1 is time during which metal ion may be eluted into cooling liquid so that the conductivity of the cooling liquid is increased to cause insulation decrease. The reference time t1 is varied depending on environmental conditions, and is time in the weekly unit, for example. When ts<t1 is fulfilled, the conductivity reduction process of cooling liquid is unnecessary, and it is considered that the insulation decrease between the fuel cell 10 and the vehicle body BD through the cooling circuit 11 is not occurred. Therefore, in the outside of the fuel cell system FCS, the fuel cell region SE1 and the fuel cell outside region SE2 are not connected electrically through the vehicle body BD. Even when the relay 41 is connected, there is not formed an outer current path electrically connecting the vehicle body BD, the fuel cell region SE1, and the fuel cell outside region SE2. As a result, the relay 41 is connected to connect the fuel cell 10 with the power control unit 21 at timing when the drive of the driving motor 42 is requested without adjusting timing between connection timing of the relay 41 and other process.

When ts<t1 is not fulfilled (No at Step S206), the CPU 500 performs conductivity reduction process before having the relay 41 connect (Step S208). When ts<t1 is not fulfilled, the conductivity of cooling liquid is increased, which may cause insulation decrease between the fuel cell 10 and the vehicle body BD through the cooling circuit 11. In addition, the insulation decrease in the fuel cell outside region SE2 is also detected and specified. Therefore, in the outside of the fuel cell system FCS, the fuel cell region SE1 and the fuel cell outside region SE2 may be connected electrically through the vehicle body BD. When the relay 41 is connected, there is formed an outer current path electrically connecting the vehicle body BD, the fuel cell region SE1, and the fuel cell outside region SE2. When the start of the fuel cell 10 is allowed in such a state, a current generated in the fuel cell 10 may flow in the outer current path. In addition, in the conductivity reduction process, the cooling liquid pump 40 is driven with the secondary battery 20 as a power source, and thus with the connection of the relay 41, a current from the secondary battery 20 may flow in the outer current path. Then, in the first embodiment, the conductivity reduction process of cooling liquid is performed without having the relay 41 connect to prevent application of high voltage power of the secondary battery 20 and high voltage power caused by power generation of the fuel cell 10 on the outer current path.

The CPU 500 retains the cooling liquid path through the ion exchanger 113 until the conductivity reduction process is completed (No at Step S210). Once the conductivity reduction process is completed (Yes at Step S210), the CPU 500 transmits control signals for switching a feeding destination of cooling liquid to the heat exchanger 112, to the switching valve 114. The completion of the conductivity reduction process may be determined by waiting the elapse of conductivity reduction process time predetermined experimentally in accordance with the vehicle leave time ts, e.g., the elapse of several minutes, or may be determined when a conductivity detected by the conductivity detection sensor is reduced to a conductivity reference value.

Once the conductivity reduction process is completed, the CPU 500 has the relay 41 connect (Step S212), and finishes the process routine. The CPU 500 transmits control signals in accordance with a request output from a driver to the power control unit 21, and drives the driving motor 42 using power generated by the fuel cell 10 to allow the vehicle FCV to travel.

In the fuel cell system FCS according to the second embodiment, whether the conductivity reduction process is to be performed is determined considering the increase of conductivity of cooling liquid in accordance with the elapsed time from the finish of the previous operation of the fuel cell system FCS. Therefore, when the conductivity reduction process is unnecessary, it is possible to immediately allow activation of the fuel cell system FCS. By contrast, when the conductivity reduction process is required, it is possible to prevent a current leak to the outside of the fuel cell system FCS from the high voltage circuit of the fuel cell system FCS. Therefore, as compared with the case in which the conductivity reduction process is performed uniformly, it is possible to prevent an electric leak to the outside of the fuel cell system FCS from the high voltage circuit of the fuel cell system FCS while improving driver's convenience. In addition, in the fuel cell system FCS according to the second embodiment, it is also possible to obtain the advantage by the fuel cell system FCS of the first embodiment.

Third Embodiment

The following will describe a fuel cell system according to the third embodiment. FIG. 7 is a flowchart illustrating a process routine of system activation process performed in activation of the fuel cell system according to the third embodiment. The hardware configuration of the fuel cell system according to the third embodiment is same as that of the fuel cell system FCS according to the first embodiment. Thus, the same symbols as in the first embodiment are given to omit the explanation. Moreover, the system activation program P2b of the third embodiment is different from the system activation programs P2, P2a of the first and second embodiments in the point that it is a comprehensive system activation program not supposing insulation decrease, and is able to immediately allow, using power of the secondary battery 20, the vehicle FCV to travel after system activation. Therefore, the same process steps as in the activation process in the first and second embodiments are represented with the same symbols and the explanation thereof is omitted. The different process steps will be described in detail.

The system activation process in the third embodiment is achieved by the CPU 500 performing the system activation program P2b in response to an on-input of the system switch 30. The CPU 500 obtains insulation decrease information stored in the memory 501, and determines whether the insulation decrease has been detected in the previous operation of the fuel cell system FCS (Step S200a). When the obtained insulation decrease information does not indicate recording of insulation decrease (No at Step S200a), the process moves to Step S212 so that the CPU 500 has the relay 41 connect. This is because when the insulation decrease is not occurred in the fuel cell system FCS, an outer current path is not formed, which dispenses with adjustment of connection timing of the relay 41.

When the obtained insulation decrease information indicates recording of insulation decrease (Yes at Step S200a), the CPU 500 obtains the specified insulation decrease region (Step S200). Thereafter, the CPU 500 performs Steps S202 to S208.

Receiving a vehicle FCV driving request from a driver during the conductivity reduction process, the CPU 500 transmits control signals to the power control unit 21 to allow the vehicle FCV to travel in accordance with a request output input by the driver. To be more specific, before the conductivity reduction process is completed, the power control unit 21 drives, with the secondary battery 20 as a power source, the driving motor 42 in accordance with the request output by the driver to allow the vehicle FCV to travel (Step S209).

The CPU 500 performs Step S210 and Step S212, and finishes the process routine.

In addition to the advantages obtained by the fuel cell system FCS according to the first and second embodiments, it is possible, in the fuel cell system FCS according to the above-described third embodiment, to allow the vehicle FCV to travel in accordance with a request by a driver without waiting completion of the conductivity reduction process. That is, in the configuration where the relay 41 is connected after completion of the conductivity reduction process of cooling liquid, when the insulation decrease of the fuel cell system FCS is occurred in the fuel cell outside region SE2, it is possible to drive the driving motor 42 using power of the secondary battery 20 during the conductivity reduction process to allow the vehicle FCV to travel. Moreover, whether the insulation decrease has been detected is determined when the previous operation of the fuel cell system FCS is finished. Thus, it is possible to perform activation process when the insulation decrease is occurred and activation process when the insulation decrease is not occurred through the common activation process.

Modifications

(1) First Modification

In the first to the third embodiments, only the cooling liquid pump 40 is operated in the conductivity reduction process, and the supply of reaction gas to the fuel cell 10 is started after the relay 41 is connected. However, the supply of reaction gas to the fuel cell 10 may be started in the conductivity reduction process before the relay 41 is connected. In such a case, it is possible to start the fuel cell 10 more quickly. Moreover, as long as the relay 41 is disconnected, the fuel cell 10 does not start power generation, and an outer current path connecting the vehicle body BD, the fuel cell region SE1, and the fuel cell outside region SE2 is formed.

(2) Second Modification

In the first to the third embodiments, the cooling liquid pump 40 is operated using the secondary battery 20 in the conductivity reduction process. However, when the auxiliary device control unit for the cooling liquid pump 40 is provided between the relay 41 and the fuel cell 10, the cooling liquid pump 40 may be operated using power generated by the fuel cell 10. In this case, it is possible to quickly allow the vehicle FCV to travel using power from the fuel cell 10 after the conductivity reduction process.

(3) Third Modification

The first to the third embodiment have exemplified the fuel cell system FCS mounted on the vehicle body BD. However, the fuel cell system FCS may be mounted on a mobile body such as a ship and a train, or may be a stationary fuel cell system FCS. Also in these cases, it is possible to solve the problems due to insulation decrease same as the present disclosure.

The above has described the present disclosure based on the embodiments and the modifications. However, the above-described embodiments of the disclosure are made to facilitate understanding of the disclosure, and do not limit the disclosure. The present disclosure may be modified and improved without departing from the scope of the claims, and includes the equivalents thereof. For example, the technical features in the embodiments and modifications corresponding to the technical features of each aspect described in the summary may be appropriately substituted or combined to solve part or all of the above-described problems or achieve part or all of the above-described effects. Moreover, as long as the technical features are not described as essential in the specification, they may be deleted appropriately.

What is claimed is:

1. A method of controlling a fuel cell system with a fuel cell, comprising:
   receiving a request for starting the fuel cell;
   obtaining insulation decrease information specifying an insulation decrease occurred region in the fuel cell system; and
   performing, based on the insulation decrease information specifying that the insulation decrease occurred region is not a fuel cell region including the fuel cell and a cooling circuit with circulating cooling liquid, a conductivity reduction process on the cooling liquid before having a relay connect, the relay being arranged between a high voltage circuit for driving an electromotor and the fuel cell, and performing a start process including having the relay connect after completing the conductivity reduction process.

2. The method of controlling a fuel cell system in accordance with claim 1, wherein the start process has the relay connect without performing the conductivity reduction process when a stop period of the fuel cell system is shorter than a predetermined period, or performs the conductivity reduction process and has the relay connect after completing the conductivity reduction process when the stop period of the fuel cell system is equal to or longer than the predetermined period.

3. The method of controlling a fuel cell system in accordance with claim 2, wherein the start process includes having the relay connect without performing the conductivity reduction process based on the insulation decrease information specifying that the insulation decrease occurred region is the fuel cell region.

4. The method of controlling a fuel cell system in accordance with claim 1, wherein the start process further includes driving, when the conductivity reduction process is performed, the electromotor using a secondary battery connected to the high voltage circuit before completing the conductivity reduction process, and having the relay connect after completing the conductivity reduction process to drive the electromotor using the fuel cell.

5. The method of controlling a fuel cell system in accordance with claim 4, wherein the conductivity reduction process is performed by driving a cooling liquid pump using power of the secondary battery and letting the cooling liquid flow to the conductivity reduction unit.

6. The method of controlling a fuel cell system in accordance with claim 1, wherein
   the insulation decrease information further includes information of whether insulation decrease has occurred, and
   the start process includes performing, when the insulation decrease information indicates occurrence of insulation decrease, the conductivity reduction process in accordance with the insulation decrease occurred region, or connecting the relay without performing the conductivity reduction process when the insulation decrease information does not indicate occurrence of insulation decrease.

7. The method of controlling a fuel cell system in accordance with claim 1, further comprising:
   specifying whether the insulation decrease occurred region detected by an insulation detection device is a fuel cell region or a region other than the fuel cell region, generating the insulation decrease information, and storing the insulation decrease information in a storage unit.

8. The method of controlling a fuel cell system in accordance with claim 7, wherein specifying the insulation decrease occurred region, generating the insulation decrease information, and storing the insulation decrease information in the storage unit are performed when the fuel cell system is stopped.

9. The method of controlling a fuel cell system in accordance with claim 1, wherein the insulation decrease information indicates occurrence of insulation decrease between a vehicle body of a vehicle and the fuel cell system.

10. A method of controlling a fuel cell system with a fuel cell, comprising:
    receiving a request for starting the fuel cell;
    obtaining insulation decrease information specifying that an insulation decrease occurred region in the fuel cell system is either a fuel cell region including the fuel cell and a cooling circuit with circulating cooling liquid or a no fuel cell region; and performing, based on the insulation decrease information specifying that the specified insulation decrease occurred region is the no fuel cell region, a conductivity reduction process on the cooling liquid before having a relay connect, the relay being arranged between a high voltage circuit for driving an electromotor and the fuel cell, and performing a start process including having the relay connect after completing the conductivity reduction process.

* * * * *